United States Patent [19]

Okamoto

[11] Patent Number: 4,741,554
[45] Date of Patent: May 3, 1988

[54] CONTROL SYSTEM FOR AUTOMOTIVE VEHICLE SUSPENSION HAVING VARIABLE DAMPING CHARACTERISTICS WITH ANTI-DIVE CONTROL DURING DECELERATION

[75] Inventor: Mitsuyuki Okamoto, Isehara, Japan

[73] Assignee: Nissan Motor Company, Limited, Kanagawa, Japan

[21] Appl. No.: 791,061

[22] Filed: Oct. 24, 1985

[30] Foreign Application Priority Data

Oct. 24, 1984 [JP] Japan ................... 59-223269

[51] Int. Cl.⁴ .................................. B60G 17/08
[52] U.S. Cl. ........................ 280/703; 280/707
[58] Field of Search ......... 280/707, 703, 714, DIG. 1, 280/6 R, 6.1; 188/299, 319; 364/424

[56] References Cited

U.S. PATENT DOCUMENTS

| | | | |
|---|---|---|---|
| 3,003,783 | 10/1961 | Brueder | 280/707 |
| 3,427,038 | 2/1969 | Gauss et al. | 280/6 R |
| 3,827,538 | 8/1974 | Morgan | 188/299 |
| 3,945,664 | 3/1976 | Hiruma | 280/703 |
| 3,992,039 | 11/1976 | Hiruma | 280/703 |
| 4,084,667 | 4/1978 | Kurrat | 280/714 |
| 4,313,529 | 2/1982 | Kato et al. | 188/299 |
| 4,327,936 | 5/1982 | Sekiguchi | 280/711 |
| 4,333,668 | 6/1982 | Hendrickson et al. | 280/703 |
| 4,349,077 | 9/1982 | Sekiguchi | 280/707 |
| 4,579,366 | 4/1986 | Doi et al. | 280/707 |
| 4,616,163 | 10/1986 | Kanai et al. | 280/703 |

Primary Examiner—Richard A. Bertsch
Assistant Examiner—Karin L. Ferriter
Attorney, Agent, or Firm—Schwartz, Jeffery, Schwaab, Mack, Blumenthal & Evans

[57] ABSTRACT

A suspension control system detects application of vehicular brakes to make the anti-dive suspension control active. During anti-dive suspension control, the vehicle height is continuously monitored to measure both the amplitude and rate of change of the vehicle height. If the height of the vehicle above the road surface changes by more than a predetermined vehicle height change criterion within a given period of time following application of the brakes, the suspension is ordered to become more stiff. This increase in stiffness suppresses the intensity of nose-dive during deceleration. Preferably, after a harder suspension is ordered, the suspension is held at the hardened level for a predetermined period of time and thereafter returned to the normal level.

32 Claims, 10 Drawing Sheets

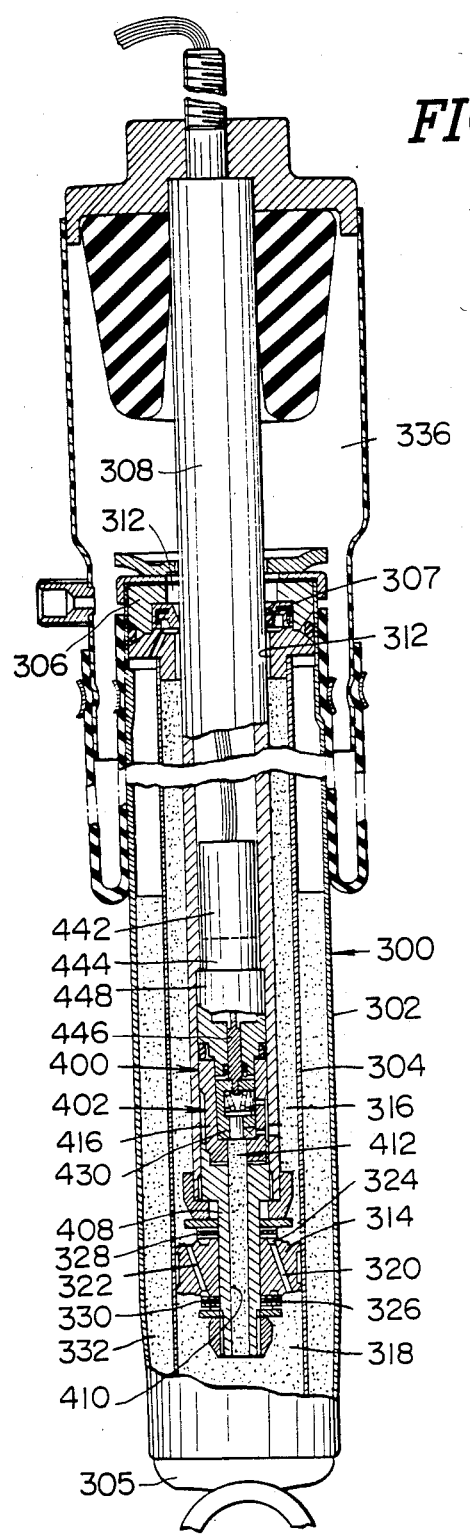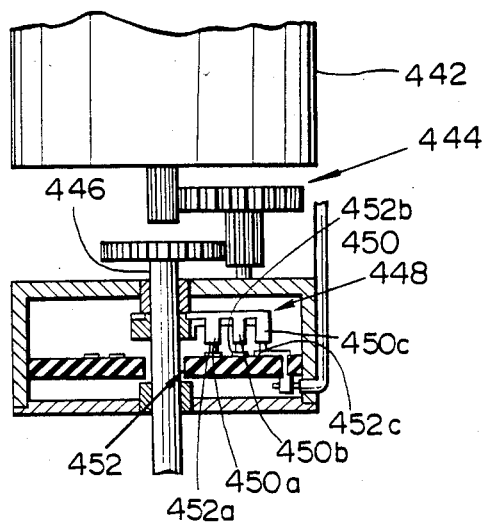
FIG. 8
FIG. 10

CONTROL SYSTEM FOR AUTOMOTIVE VEHICLE SUSPENSION HAVING VARIABLE DAMPING CHARACTERISTICS WITH ANTI-DIVE CONTROL DURING DECELERATION

BACKGROUND OF THE INVENTION

The present invention relates generally to a suspension control system for an automotive vehicle for controlling damping characteristics or stiffness of a vehicular suspension system depending upon vehicle driving conditions. In particular, the invention relates to an automotive suspension control system which performs anti-dive control for suppressing nose-dive and rebounding after nose-dive during deceleration of the vehicle.

Published Japanese Utility Model Application (Jikkai) Sho. No. 56-111009, discloses a suspension system having a variable shock absorber with adjustable shock-absorbing characteristics. The shock absorber is associated with a controller which controls its damping force. The controller operates the shock absorber so as to produce a higher damping force when it detects deceleration of the vehicle. The higher damping force is maintained as long as the vehicle brakes are applied to decelerate the vehicle. In other words, as soon as the brakes are released, the damping force to be produced by the shock absorber is reduced.

When applying brakes in order to stop the vehicle, the center of gravity shifts forward due to the inertia of the vehicle, which causes to the vehicle "nose dive". By adjusting the damping force to be produced by the shock absorber to HIGH, the magnitude of nose dive can be limited. On the other hand, at the end of vehicle deceleration, the center of gravity moves rearward, causing the front end of the vehicle to rebound. In particular, when the brake is released immediately after the vehicle stops, the controller orders the shock absorber to lower its damping force. This may intensify the rebounding behavior of the vehicle and degrade riding comfort.

Another approach has been discussed in the Published Japanese Patent Application (Tokkai) Showa 58-30816, in which abrupt deceleration of the vehicle is detected by means of a pressure sensor disposed within a hydraulic brake circuit. When abrupt deceleration of the vehicle is indicated by the pressure sensor signal value, the suspension system is hardened in order to suppress nose-dive. This suspension control technique may succeed in preventing nose-dive of the vehicle. However, since the magnitude of nose-dive varies with the deceleration of the vehicle, and rebounding magnitude after nose-dive varies with the magnitude of the nose-dive, the aforementioned suspension control system does not provide satisfactorily precise control of the suspension stiffness or damping characteristics according to the vehicle driving conditions.

SUMMARY OF THE INVENTION

Therefore, it is a principle object of the invention to provide a suspension control system which can precisely control the damping characteristics of vehicular suspension so as to successfully and satisfactorily perform anti-dive and anti-rebound functions.

In order to accomplish the above-mentioned and other objects, a suspension control system, according to the present invention, detects application of vehicular brakes to make the anti-dive suspension control active. During anti-dive suspension control, the vehicle height is continuously monitored to measure both the amplitude and rate of change of the vehicle height. If the height of the vehicle above the road surface changes by more than a predetermined vehicle height change criterion within a given period of time following application of the brakes, the suspension is ordered to become more still. This increase in stiffness suppresses the intensity of nose-dive during deceleration.

Preferably, after a harder suspension is ordered, the suspension is held at the hardened level for a predetermined period of time and thereafter returned to the normal level.

According to one aspect of the invention, a suspension control system for an automotive vehicle comprises a vehicular suspension system with damping characteristics variable at least between a first harder suspension mode and a second softer suspension mode, a first sensor which detects vehicular braking and produces a first sensor signal indicative thereof, a second sensor for monitoring vehicle height relative to a road surface and producing a second sensor signal indicative of the vehicle height, a controller responsive to the first sensor signal to derive the magnitude and rate of change of the second sensor signal values, comparing the derived magnitude of change of the second sensor signal value with a first reference value and comparing the derived rate of change of the second sensor signal value with a second reference value, and operating the vehicular suspension system in the first harder suspension mode when the magnitude of change of the second sensor signal is greater than the first reference value and the rate of change of the second sensor signal value is higher than the second reference value, and in the second softer suspension mode otherwise.

According to another aspect of the invention, a suspension control system for an automotive vehicle comprises a suspension system variable of damping characteristics at least between a first harder suspension mode and a second softer suspension mode, a first sensor detecting of application iof vehicular brake and producing a first sensor signal, a second sensor monitoring vehicle level relative to a road surface and producing a second sensor signal indicative of the vehicle level, a timer responsive to the first sensor signal to measure an elasped time and producing a timer signal, a controller responsive to the first sensor signal to derive a first reference value on the basis of instantaneous value of the second sensor signal at the time of occuring of the first sensor signal, comparing subsequently input the second sensor signal value with the first reference value to depect decreasing of the second sensor signal value across the first reference value, latching the timer signal value in response to the second sensor signal value decreasing across the first reference value, comparing the latched timer signal value with a predetermined second reference value, and operating the vehicular suspension system to the first harder suspension mode when the timer signal value is smaller than the second reference value, and to the second softer suspension mode otherwise.

The controller varies the first reference value according to variation of the instantaneous value of the second sensor signal. In practice, the controller derives the first reference value by subtracting a given constant value from the instantaneous value.

The the suspension system varies hardening level between a plurality of levels when the first harder mode is ordered, and the controller selects one of the hardening level depending upon the latched timer value. The controller compares the latched timer signal with a plurality of respectively different second reference values for determining the hardening level of the suspension system.

The suspension system is variable of the hardening level between a highest level, a lowtest level and an intermediate level between the highest and lowest level, and the controller compares the timer signal value with a greaterest second reference value, a smallerest second reference value and an intermediate second reference value which is between the greatest and smallest second reference values, the controller selecting one of the hardening level in such a manner than:

when the timer signal value is smaller than the smallest second reference signal value, the highest hardening level is selected;

when the timer value is greater than the smallest second reference value but smaller than the intermediate second reference value, the intermediate hardening level is selected;

when the timer value is greater than thes intermeidate second reference value but smaller than the greatest second reference value, the softest hardening mode is selected; and when the timer value is greater than the greatest second reference value, the controller maintains the second softer mode.

The controller maintains the suspension system in the first mode for a given period of time. The controller is adapted to maintain the suspension system in the second mode while the vehicle speed signal value is held greater than the threshold value.

The suspension system comprises a hydraulic shock absorber which is variable of damping characteristics at least between the first mode and the second mode. The hydraulic shock absorber defines upper and lower fluid chambers filled with a working fluid and variable of respective volumes according to a piston stroke, the shock absorber being provided with a flow control value which is variable of valve position between a first mode position for restricting flow rate of working fluid in one of the upper and lower fluid chambers to the other through a flow path at a minimum rate, and a second mode position for allowing fluid flow through the flow path at a maximum rate.

In the alternative, the suspension system comprises a stabilizer which is variable of stiffness at least between the first mode and the second mode.

In the further alternative, the suspension system comprises a pneumatic spring means providing pneumatical damping force for the corresponding suspension, which pneumatic spring means is variable of pneumatic pressure at least between the first mode and the second mode.

According to a further aspect of the invention, a method for anti-dive controlling an automotive suspension system which is variable of damping characteristics at least between a first harder suspension mode and a second softer suspension mode, which comprises the steps of:

detecting vehicular braking condition;

monitoring a vehicle level relative to a road surface;

detecting, in response to vehicular braking condition, magnitude of variation of the vehicle level greater than a given first threshold;

detecting, in response to vehicular braking condition, speed of variation of the vehicle level higher than a given second threshold; and operating the suspension system to the first harder suspension mode when the variation magnitude of the vehicle level greater than the first given threshold and the variation speed of the vehicle level higher than the second given threshold are detected.

BRIEF DESCRIPTION OF THE DRAWINGS

The present invention will be understood more fully from the detailed description given herebelow aand from the accompanying drawings of the preferred embodiments of the invention, which, however, should not be taken to limit the invention to the specific embodiment or embodiments, but are for explanation and understanding only.

In the drawings:

FIG. 8 is a longitudinal section through a modified shock absorber adapted to carry out suspension control according to the present invention;

FIG. 10 is an enlarged section through a valve position sensor employed in the shock absorber of FIG. 8;

DESCRIPTION OF THE PREFERRED EMBODIMENT

Figure 1:
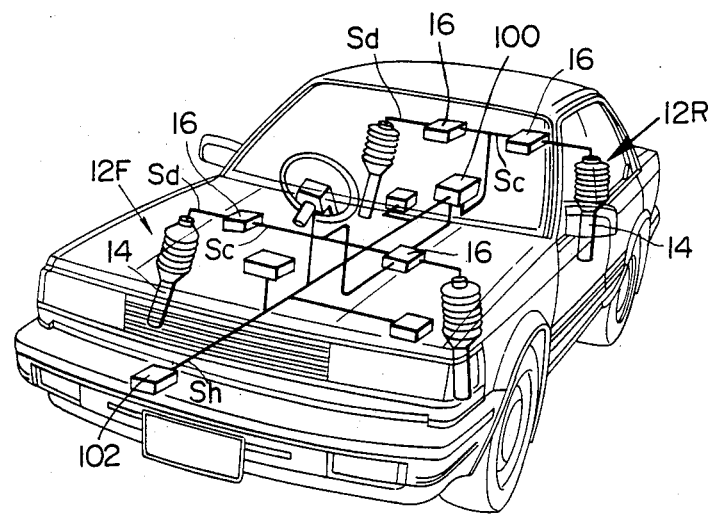
FIG. 1 is a perspective illustration of a vehicle wiht a diagram in perspective of essential elements of a vehicle suspension system with a variable damper to which the preferred embodiments of a shock absorbing characteristics control system are applied.
Figure 2:
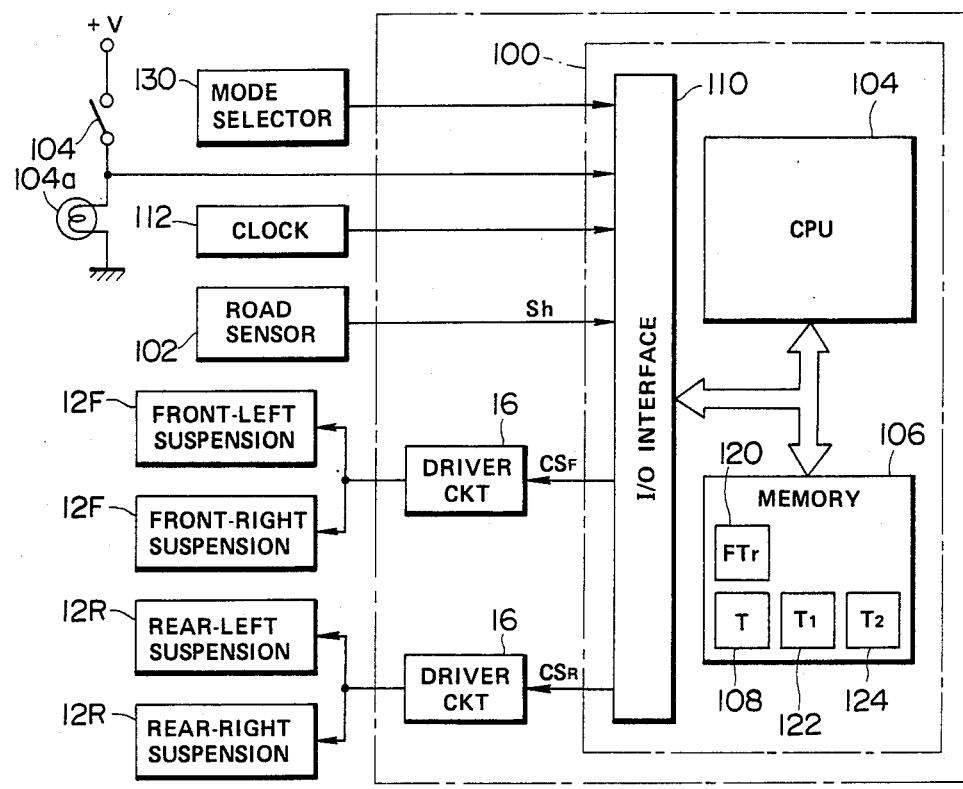
FIG. 2 is a block diagram of the first embodiment of a suspension control system according to the present invention.
Figure 7:
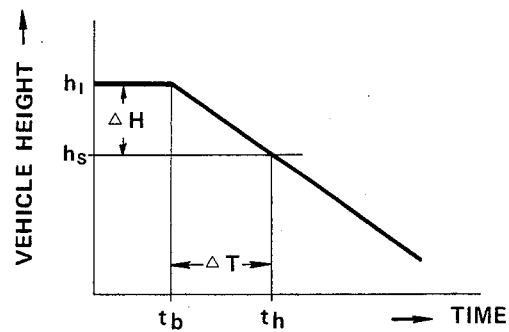
FIG. 7 is a diagram illustrating the relationship between the two nose-dive detection criteria used in the program of FIG. 6.

Referring now to the drawings, particularly to FIGS. 1 and 2, the first embodiment of a suspension control system, according to the invention, has front and rear suspensions including front and rear suspension struts 12F and 12R. Each of the front and rear suspension struts 12F and 12R includes a variable shock absorber 14 with damping characteristics variable at least between HARD mode and SOFT mode. In the HARD mode, the shock absorber 14 produces a higher shock absorbing or damping force to increase the overall stiffness of the suspension. On the other hand, in SOFT mode, the shock absorber 14 produces a lower shock absorbing force.

The shock absorber 14 is connected to a driver circuit 16 which is, in turn, connected to a controller 100. The controller selects the proper mode of the shock absorber on the basis of one or more preselected suspension control parameters. The driver circuit 16 is responsive to a suspension control signal produced by the controller 100 to operate the shock absorber 14 to the one of the HARD AND SOFT modes selected by the controller. In accordance with the shown embodiment, the controller 100 is connected to a road sensor 102 which comprises an ultra-sonic sensor which transmits ultra-sonic waves toward the road surface and receives reflected ultra-sonic waves in order to measure the vehicle body-to-road surface distance. The road sensor 102 outputs a vehicle height indicative signal $S_h$ which has a value h representative of the vehicle body height relative to the road surface. The controller 100 is also connected to a brake switch 104 which is turned on when a vehicular brake system is activated by applying the brakes. The brake switch 104 is per se well known and connected to a brake monitor lamp 104a in a known manner.

In practice, the controller 100 may be also connected to other sensors, such as a vehicle speed sensor for monitoring smoothness of the road surface as part of vehicle speed-dependent suspension control, a steering angle sensor for monitoring steering behavior as part of roll-suppressive suspension control and so forth.

In the preferred embodiment, the controller 100 controls the damping characteristics of the suspension so as to preventing the vehicle from nose-dive and rebounding after nose-dive. Throughout the disclosure, the control techniques used to prevent the vehicle from nose-diving and rebounding will be referred to as "anti-dive control". Also, in the disclosure, the word "rebound" or "rebounding" means vehicle rebounding motion after nose-dive. The "nose-dive" means a vehicular pitching motion in which the front end of the vehicle drops noticeably during deceleration of the vehicle.

During anti-dive suspension control, the controller 100, in the shown embodiment, monitors changes in the vehicle height or vehicle level relative to the road surface, which is represented by the vehicle height indicative signal $S_h$ produced by the road sensor 102. In particular, the preferred embodiment of the suspension control system, according to the invention, adjusts the damping characteristics of the suspension to a stiffer level when the vehicle height changes by more than a given vehicle height criterion and the rate of change exceeds a given variation speed criterion. Using both the magnitude and rate of change of the vehicle height as control parameters enables the invention to provide anti-dive suspension control precisely corresponding to the vehicle driving consitions. Therefore, the controller 100 issues a control signal ordering the HARD mode of the shock absorber 14 when the change in the vehicle height exceeds the aforementioned variation magnitude criterion at a rate exceeding the variation speed criterion due to application of the brakes.

Although the shown embodiment detects the onset of vehicle deceleration by detecting application of the brakes, it would be possible for the controller 100 to detect vehicle deceleration by detecting a drop in the vehicle speed itself or by differentiating the vehicle speed value.

Figure 3:
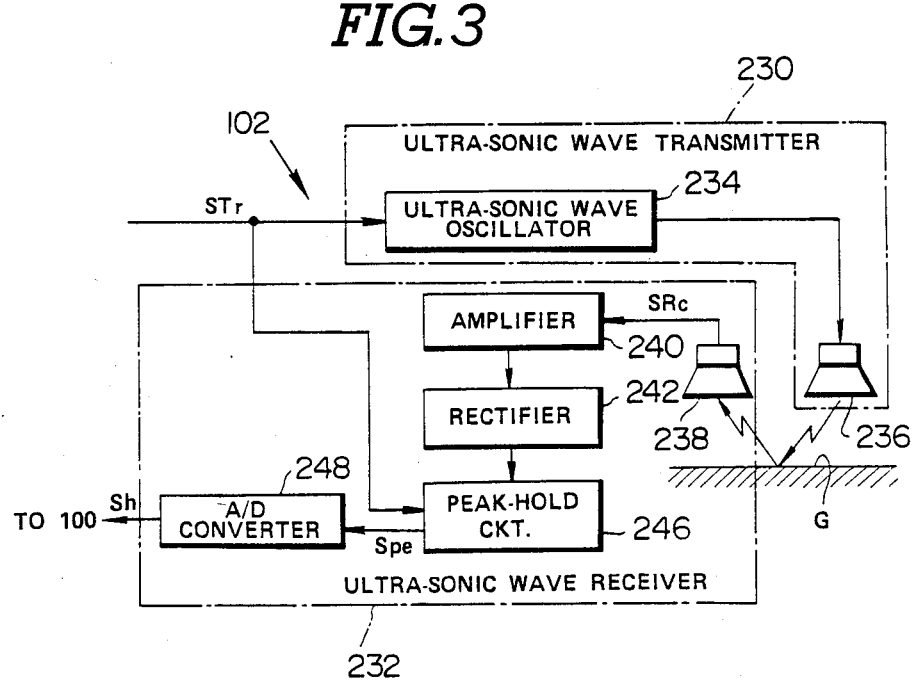
FIG. 3 is a more detailed block diagram of the road sensor of FIG. 3.

As shown in FIG. 3, the road sensor 102 comprises generally an ultra-sonic wave transmitter 230 and a reflected ultra-sonic wave receiver 232. The transmitter 230 is connected to the controller 100 to receive a trigger signal $S_{Tr}$ at a given timing. The transmitter 230 includes an ultra-sonic oscillator 234 and an ultra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 236 toward the road surface.

The ultra-sonic waves reflected by the road surface are received by a receiver section 238 of the receiver 232. The receiver section 238 produces a receiver signal $S_{Rc}$ having a value varying in accordance with the amplitude of the received ultra-sonic waves. The receiver section 238 is connected to an amplifier 240 to supply the receiver signal $S_{Rc}$ to the latter. The receiver signal $S_{Rc}$ is amplified by the amplifier 240 and transmitted to a rectifier 242. The rectifier 242 is connected to a peak-hold circuit 246 which holds the peak value of the receiver signal. The peak-hold circuit 246 produces an analog peak-value-indicative signal $S_{Pc}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100.

The peak-hold circuit 246 is also connected to the controller 100 to receive the trigger signal $S_{Tr}$. The peak-hold circuit 246 is responsive to the trigger signal from the controller 100 to clear the currently held value.

The detailed structure and operation of the aforementioned preferred embodiment of the ultra-sonic sensor has been disclosed in the co-pending U.S. patent application Ser. No. 650,705, filed Sept. 14, 1984. The disclosure of the above-identified U.S. patent application Ser. No. 650,705 is hereby incorporated by reference for the sake of disclosure.

Figure 4:
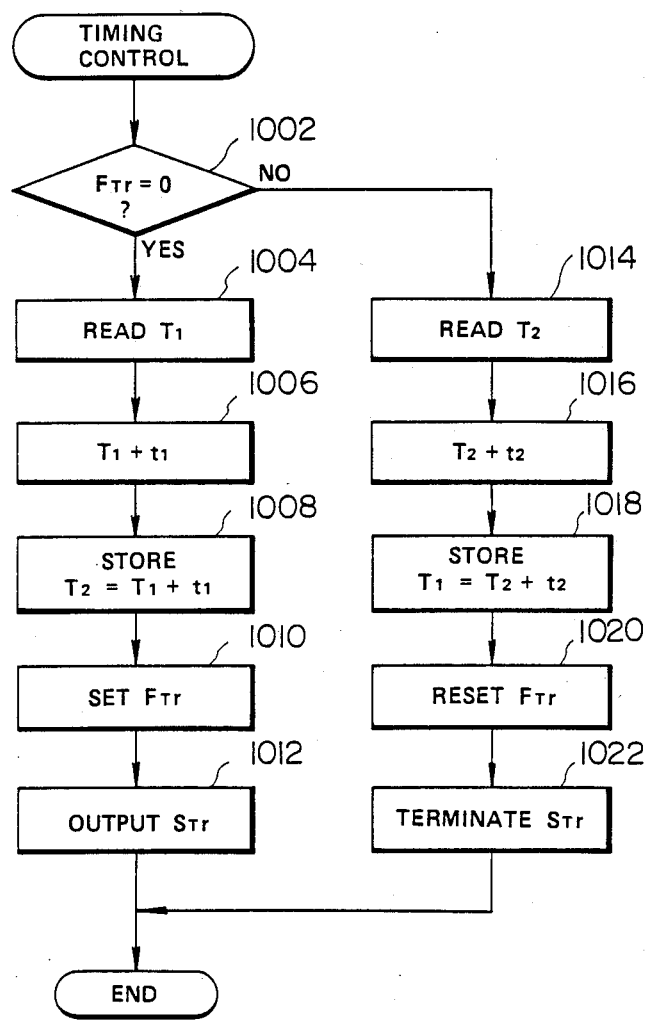
FIG. 4 is a flowchart of a road sensor timing control program executed by the controller of FIGS. 2 and 3.

FIG. 4 shows a timing control program executed by the controller 100 for controlling the trigger timing of the ultra-sonic sensor 200.

At the initial stage of execution of the timing control program, a trigger-signal-output-indicative flag $F_{Tr}$ in a memory block 120 of a memory unit 106 is checked at a step 1002. The trigger signal $F_{Tr}$ is set when the trigger signal is output through the output interface 110 to the transmitter 230 and is reset when the trigger signal is not being output.

If the trigger signal-indicative flag $F_{Tr}$ is set when checked at the step 1002, then the timer value $T_1$ of a timer 122 in memory 106 is latched at a step 1004. The timer 122 continuously counts clock pulses from a clock generator 112. A trigger-signal-ON-time count $t_1$ is added to the latched timer value $T_1$ at a step 1006. The resultant value $(T_1+t_1)$, which serves as a trigger-signal-OFF time value, is transferred to and stored in a $T_2$-register 124 in memory 106, at a step 1008. Then the flag $F_{Tr}$ is set at a step 1010. A HIGH-level output is applied to the output interface as the trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 124 continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 125 is accessed in memory 106. Similarly to the first-mentioned timer 124, the timer 125 continuously counts clock pulses from the clock generator 112. An OFF-time count $t_2$ is added to the latched timer value $T_2$ at a step 1016. The timer count $t_2$ has a value corresponding to a predetermined interval between successive trigger signals. The resultant time value $(T_2+t_2)$ is stored in the $T_1$-timer 124 of memory 106 at a step 1018. Then, the flag $F_{Tr}$ is reset at a step 1020. After the step 1020, the output level at the output interface drops LOW to terminate transmission of the trigger signal to the transmitter, at a step 1022.

Figure 5:
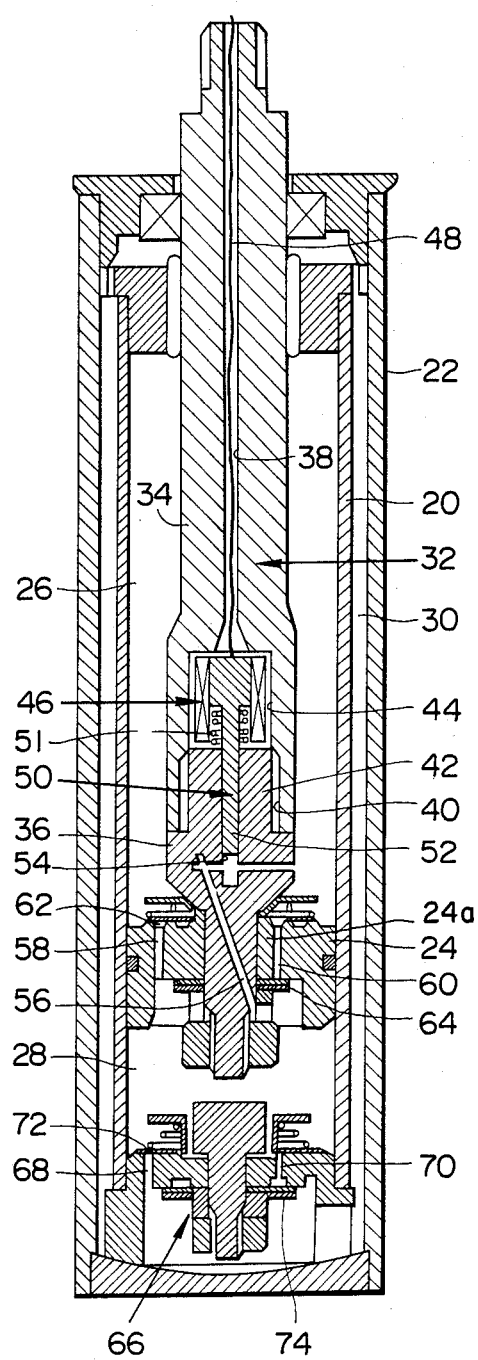
FIG. 5 is a cross-section through a shock absorber serving as the variable damper employed in the preferred embodiment of the suspension system.

In order to allow adjustment of the shock absorbing characteristics, the shock absorber 14 employed in the preferred embodiment generally comprises an inner and an outer hollow cylinders 20 and 22 arranged coaxially, and a piston 24 fitting flush within the hollow space in the inner cylinder 20, as shown in FIG. 5. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 is formed with an axially extending through opening 38.

The piston 24 defines flow-restrictive fluid passages 58 and 60. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The piston 24 has a central through opening 24a. Upper end of the opening 24a engages the lower end of the piston rod 32. The lower end of the opening 24a receives the upper end of a sleeve 52. The sleeve 52 has an axially extending bore, which receives a flow control valve spool 50, and a plurality of radially extending orifices 54. The sleeve 52 is further formed with an annular groove not shown extending around its inner periphery. The radially extending orifices 54 open into this annular groove. The outer ends of the orifices 54 opens toward the lower fluid chamber 28.

The valve spool 50 is formed with another annular groove not shown on the outer periphery thereof. This annular groove is in communication with the upper fluid chamber 26 through a fluid passage 56 defined through the piston body and the sleeve. This annular groove 60a is located at a vertical position at which it opposes the annular groove of the sleeve 52 at the lower position of the spool and does not overlap the annular groove 60b at all at the upper position of the spool.

The spool 50 is normally biased upwards by means of a bias spring 51 of an actuator 46 which comprises an electromagnetic coil housed in an enclosed casing and a yoke. The casing engages the sleeve 52 at its upper end so that the actuator 46 can be firmly mounted on the piston 24. When the electromagnetic coil of the actuator is energized, it pulls the spool 50 downwardly to move the spool to its lower position.

When the spool is in the lower position, fluid can flow between the upper and lower fluid chambers 26 and 28 through the fluid passage 56, the grooves 60a and 60b and orifices 54. Therefore, the total flow area for fluid communication between the upper and lower chambers 26 and 28 is increased. As a result, there is less resistance to flow, which softens the damping characteristics of the vehicle. On the other hand, when the spool is in the lower position fluid communication between the upper and lower fluid chambers 26 and 28 through the fluid passage 56 is blocked. Therefore, at this position, fluid communication between the upper and lower fluid chambers 26 and 28 is possible only by way of the fluid passages 58 and 60. Thus, the fluid flow area is decreased so as to exert higher resistance to fluid flow. Therefore, the damping force of the shock absorber 14 is increased.

As will be appreciated herefrom, when the controller 100 orders SOFT mode, the actuator 46 is energized to lower the spool to establish fluid communication between the upper and lower fluid chambers 26 and 28 through the fluid passage 56. On the other hand, when the controller 100 orders HARD mode, the actuator 46 is deenergized to move the spool 50 to its upper position by means of the bias spring 46d. Thus, fluid communication between the upper and lower fluid chambers 26 and 28 via the fluid passage 56 is blocked.

Returning to FIG. 2, the controller 100 is also connected to a manually operable mode-selector switch 130 which allows manual selection of control mode. The mutually operable mode-selector switch 106 may be operable between MANUAL HARD mode, MANUAL SOFT mode and AUTO mode. In MANUAL HARD mode, the controller 100 constantly orders the HARD mode of the shock absorber 14. In MANUAL SOFT mode, the controller 100 controls the shock absorber 14 so as to hold the latter in the SOFT mode. In the AUTO mode, the controller performs automatic suspension control including anti-dive control on the basis of preselected suspension control parameters.

The anti-dive suspension control processes performed by the first embodiment of suspension control system will be described with reference to FIG. 6.

Figure 6:
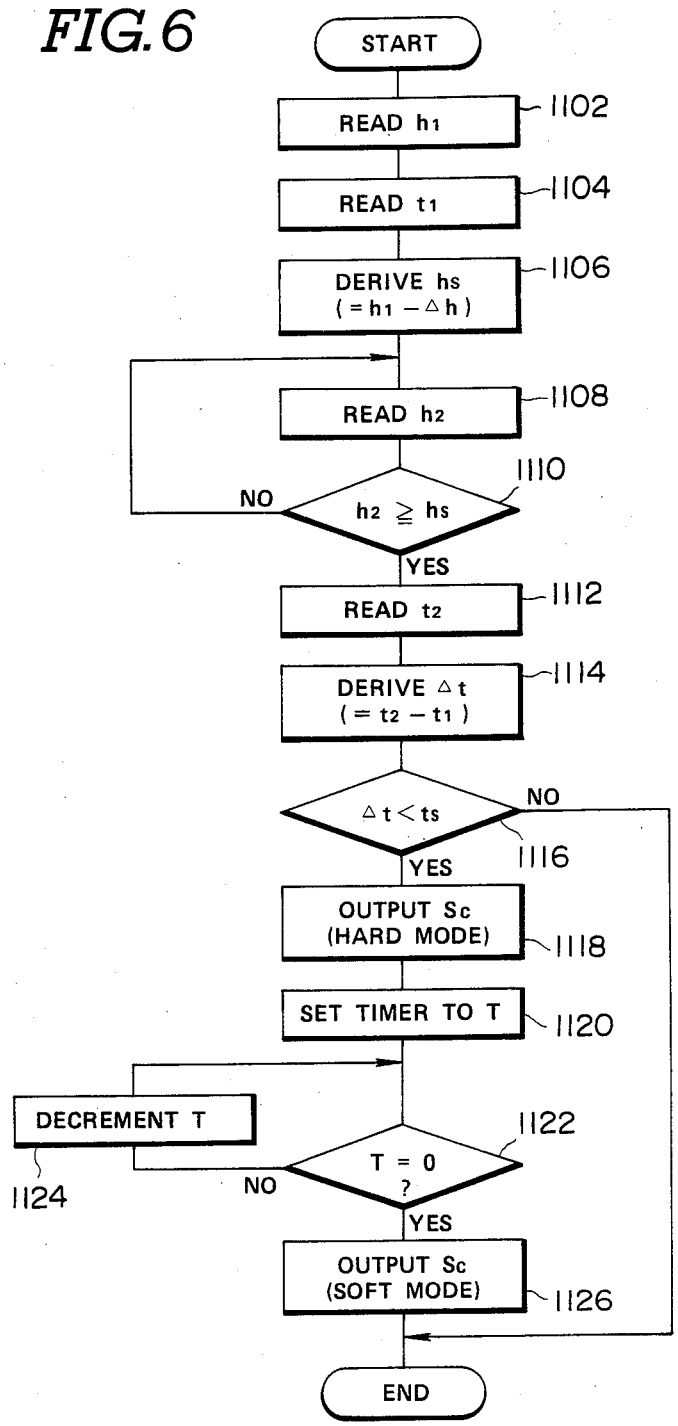
FIG. 6 is a flowchart of an anti-dive suspension control program to be executed in the control system of FIG. 2.

FIG. 6 shows an anti-dive suspension control program executed by the controller 100. The shown program may be triggered by the brake switch 104 which turns ON in response to application of the brakes. First, the signal value $h_1$ of the vehicle height indicative signal $S_h$ from the road sensor 102 is read out at a step 1102. A brake time value $t_1$ is then read from a timer T 108 at a step 1104. A predetermined value $\Delta H$ is subtracted from the current vehicle height indicative signal value $h_1$ to derive a reference value $h_s$ at a step 1106.

It should be noted that the predetermined value $\Delta H$ serves as a nose-dive-indicative hard-suspension criterion defining a threshold value of the degree of nose-dive triggering changeover between the HARD mode and the SOFT mode of the suspension.

Subsequently, the signal value $h_2$ of the vehicle height indicative signal $S_h$ subsequently input, is read out at a step 1108. Then, the read out signal value $h_2$ is compared to the reference value $h_s$, at a step 1110. If the vehicle height indicative signal value $h_2$ is equal to or greater than the reference value $h_s$, control returns to the step 1108 to read out the next vehicle height indicative signal value $h_2$. The steps 1108 and 1110 form a loop which is repeated until the vehicle height indicative signal value $h_2$ drops below the reference value $h_s$. Once the vehicle height indicative signal value $h_2$ drops below the reference value $h_s$ at the step 1110, then, the timer value $t_2$ of the timer 108 is read out at a step 1112. On the basis of the timer values $t_1$ and $t_2$ respectively read out at the steps 1104 and 1112, an elapsed time value $\Delta t$ is derived, at a step 1114. The derived elapsed time value $\Delta t$ is compared with a predetermined timer threshold $t_s$ at a step 1116.

It should be noted that the predetermined timer threshold $t_s$ defines an elapsed period required to increase the magnitude of nose-dive beyond the nose-dive responsive hard suspension criteria as defined by the predetermined value $\Delta h$.

When the elapsed time value $\Delta t$ is equal to or greater than the timer threshold $t_s$ as compared at the step 1116, then the process ends and thus the suspension is maintained in the SOFT mode. On the other hand, when the elapsed time value $\Delta t$ is smaller than the timer threshold $t_s$, then the HARD mode of the suspension is ordered and the control signal $Sh_c$ ordering the HARD mode is output to the driver circuit at a step 1118. Thereafter, another timer 110 is set to a predetermined value which defines a period of time for maintaining the suspension in the HARD mode, at a step 1120. Then, the timer value T of the timer 110 is checked to see whether it is zero, at a step 1122. If the timer value T is greater than zero, the timer value T is decremented by a predetermined value, e.g. 1, at a step 1124. A loop of the steps 1122 and 1124 is repeated until the timer value T becomes zero. When the timer value T as checked at the step 1122 becomes zero, the SOFT mode of the suspension is ordered and the control signal $S_c$ is output at a step 1126.

As will be appreciated from the above and from FIG. 6, when the brake pedal (not shown) is depressed, the anti-dive control program is triggered. In execution of the anti-dive control program, a variation of height (lowering) of the front end (where the road sensor 102 is mounted) of the vehicle is monitored. Also, an elapsed time $\Delta t$ from the time $t_1$ is measured. When the height of the front end is lowered across the nose-dive responsive hard suspension criteria as represented by the predetermined value $\Delta h$, the elapsed time $\Delta t$ from the starting $t_1$ to the time $t_2$, at which the height of the front end of the vehicle is lowered across the nose-dive responsive hard suspension criteria, is compared with the timer threshold $t_s$. The HARD mode of the suspension is ordered only when the elapsed time $\Delta t$ is shorter than the given elapsed time as represented by the timer threshold $t_s$. Therefore, a lowering magnitude and lowering speed dependent anti-dive suspension control can be performed by the preferred embodiment of the suspension control system according to the invention.

As set forth, the shown embodiment employs two-way adjustable shock absorbers to adjust the damping characteristics of the suspension, so that anti-dive suspension control is performed in either HARD mode or SOFT mode. However, it would be possible to control the suspension to provide anti-dive characteristics by means of a three-way adjustable shock absorber which can operate in the HARD mode, the SOFT mode or a MEDIUM mode wherein the damping characteristics of the suspension are intermediate the HARD mode and the SOFT mode. An example of a three-way adjustable shock absorber will be described herebelow with reference to FIGS. 8 to 12.

The hydraulic shock absorber 14 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 304 and defining upper and lower fluid chambers 316 and 318 therein.

The piston 314 has fluid passages 320 and 322 connecting the upper and lower fluid chambers 316 and 318. The piston 314 also hasa annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid paassage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 9:
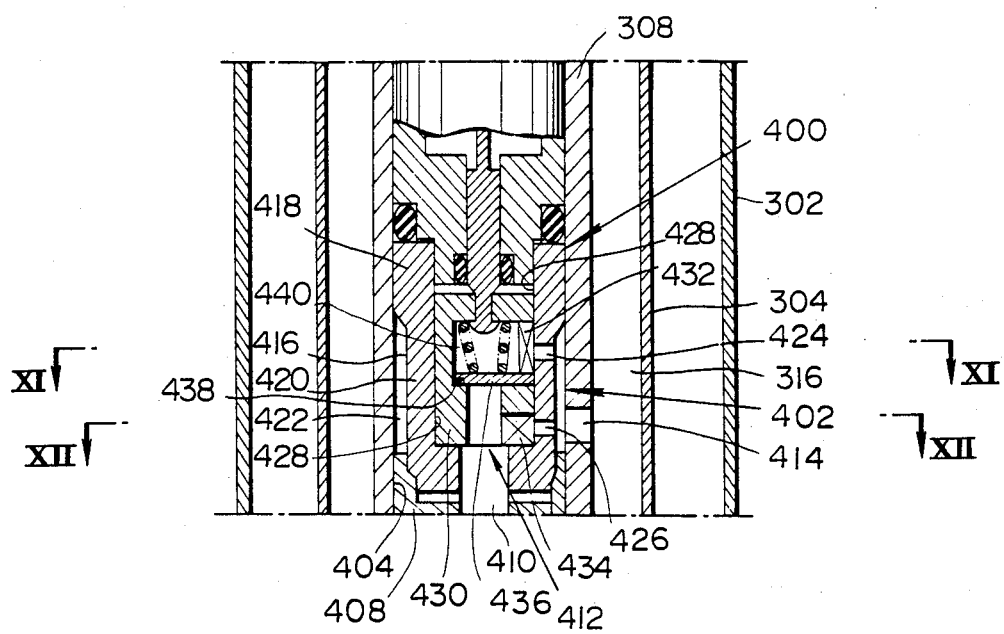
FIG. 9 is an enlarged section through the major part of the shock absorber of FIG. 8.

As shown in FIG. 9, the piston rod 308 defines an axial through opening 404 with the lower end opening into the lower fluid chamber 318. A fitting 408 seals the lower end of the opening 404 of the piston rod and has axial through opening 410, the axis of which is parallel to the axis of the through opening 404 of the piston rod. Thus, the through openings 404 and 410 constitute a fluid path 412 extending through the piston rod. The piston rod 308 also has one or more radial orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internaal periphery of the through opening. The stationary valve member 416 has a portion 420 with a smaller diameter than that of the upper end 418 so as to define an annular chamber 422 in conjunction with the inner periphery of the through opening 404 of the piston rod. The stationary valve member 416 has two sets of radial orifices 424 and 426 and an internal space 428. The radial orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the statioary valve member 416 to establish a liquid-tight seal therebetween. Radial orifices 432 and 434 are defined in the rotary valve member 430 at positions opposite the orifices 424 and 426 of the stationary valve member 416.

Figure 11:
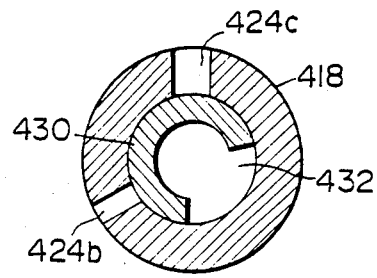
FIGS. 11 and 12 are cross sections taken respectively along lines XI—XI and XII—XII of FIG. 9.
Figure 12:
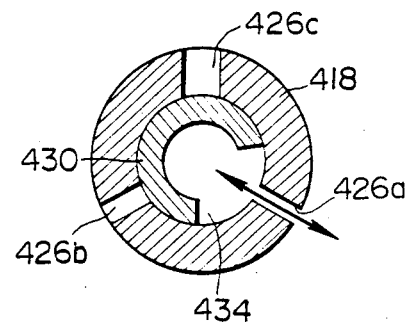

As shown in FIGS. 11 and 12, the orifices 424 and 426 respectively include first, second and third orifices 424a, 424b, 424c, and 426b, 426c. The first orifice 424a has the narrowest cross-sections and the orifice 432 is adapted to be in alignment with the first orifice to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426b are intermediate those of the first and third orifices and the orifices 432 and 434 are adapted to align therewith in the case of the MEDIUM mode.

A check valve 436 is built into the internal space of the rotary valve member 430. The check valve 436 is normally biased towards a valve seat 438 by means of a bias spring 440 to allow one-way fluid flow from the lower fluid chamber to the upper fluid chamber. This causes the bound damping force to be somewhat weaker than the rebound damping force.

The rotary valve member 430 is associated with an electrically operable actuator such as an electrical stepper motor 442 through a differential geara unit 444 and an output shaft 446 as shown in FIG. 10. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The stepper motor 442 is electrically connected to a controller 100 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 8, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIGS. 11 and 12, which illustrate the HARD mode. In this case, the orifice 432 of the rotary valve 430 is not in alignment with either of the orifices 424b or 424c and the orifice 434 is in alignment with the smallest orifice 426a. During vehicle rebounding motion, i.e., in the piston expansion stroke, the fluid flows from the upper fluid chamber 316 to the lower fluid chamber 318 though the orifice 426a. Similarly, during vehicle bounding motion, the fluid flows from the lower fluid chamber 318 to the upper fluid chamber 316 through orifice 426a. Since the first orifice 426a is the narrowest, the damping force produced in this mode is the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to facilitate fluid flow. Since the third orifices 424c and 426c are the widest of the three sets, as described above, the damping force created in this SOFT mode is the lowest.

According to the shown embodiment, the electric stepper motor 442 is connected to the controller 100 through the driver circuit 16. Similarly to the case of the two-way shock absorber, the controller 100 selects the appropriate damping force state in accordance with detected road surface conditions but in this case produces a three-way control signal which orders the shock absorber to one of the SOFT, MEDIUM and HARD modes. The driver circuit 16 is responsive to the control signal to drive the stepper motor 442 to turn the rotary valvemember 430 to the corresponding valve position.

In the preferred anti-dive suspension control, HARD mode is used when stiffer suspension is ordered, SOFT mode and MEDIUM mode are selectively used in all cases referred to as SOFT mode in the preceding first embodiment depending upon various preselected control parameters.

Figure 13:
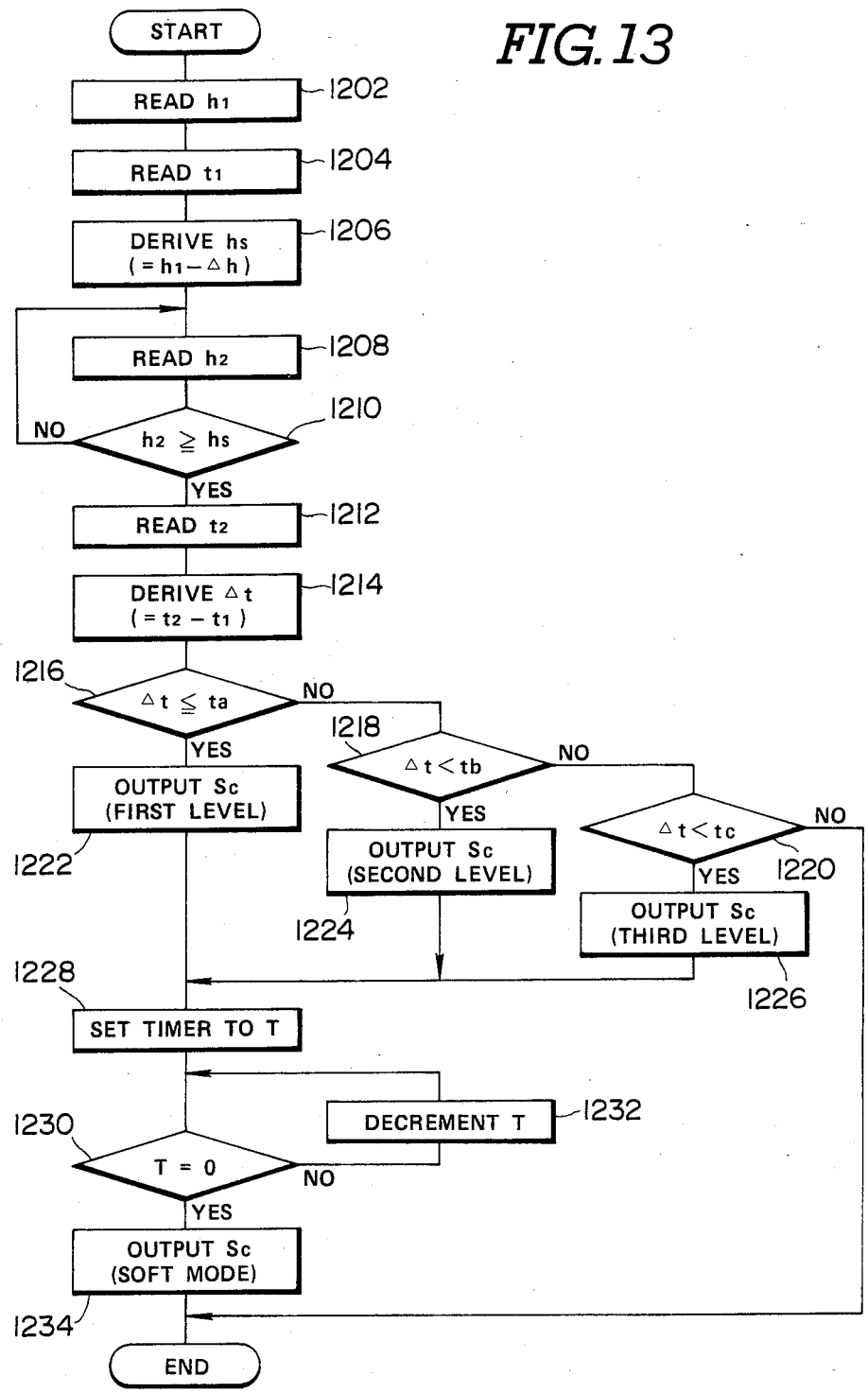
FIG. 13 is a flowchart of the third embodiment of a suspension control program to be executed by the suspension control system according to the invention.

It is also possible to adjust the damping characteristics of the vehicular suspension system to more than three levels. FIG. 13 shows a modification of the anti-dive control program for varying damping characteristics of the suspension system into four levels. For instance, in the anti-dive control program of FIG. 13, damping characteristics may assume a SOFT mode, a first HARD mode which is the hardest among the four levels, a second HARD mode, in which hardness of the suspension is next to the first HARD mode, or a third HARD mode which is softer than the second HARD mode but harder than the SOFT mode. The shown embodiment uses the rate of change of vehicle height as a control parameter in selecting which suspension stiffness mode to use during deceleration.

Similarly to the anti-dive control program of the first embodiment, this anti-dive control program is triggered in response to application of the brakes.

First, the signal value $h_1$ of the vehicle height indicative signal $S_h$ from the road sensor 102 is read out at a step 1202. A brake time value $t_b$ is then read from a timer T 108 at a step 1204. A predetermined value $\Delta H$ is subtracted from the current vehicle height indicative signal value $h_1$ to derive a reference value $h_s$ at a step 1206.

Subsequently, the signal value $h_2$ of the vehicle height indicative signal $S_h$ subsequently input, is read out at a step 1208. Then, the read out signal value $h_2$ is compared to the reference value $h_s$, at a step 1210. If the vehicle height indicative signal value $h_2$ is equal to or greater than the reference value $h_s$, control returns to the step 1208 to read out the next vehicle height indicative signal value $h_2$. The steps 1208 and 1210 form a loop which is repeated until the vehicle height indicative signal value $h_2$ drops below the reference value $h_s$. Once the vehicle height indicative signal value $h_2$ drops below the reference value $h_s$ at the step 1210, then, the timer value $t_2$ of the timer 108 is read out at a step 1212. On the basis of the timer values $t_1$ and $t_2$ respectively read out at the steps 1204 and 1212, an elapsed time value $\Delta t$ is derived, at a step 1214. The derived elapsed time value $\Delta t$ is compared with a predetermined timer threshold $t_a$ at a step 1216.

When the elapsed time value $\Delta t$ is equal to or greater than the first timer threshold $t_a$ as compared at the step 1216, then process goes a step 1218 to compare the elapsed time value $\Delta t$ with a predetermined second timer threshold $t_b$ which is representative of the vehicle level variation speed criteria next to the first highest speed represented by the first timer threshold $t_a$. When the elapsed time value $\Delta t$ is greater than the second timer threshold $t_b$ as compared at the step 1218, then process goes to a step 1220 to compare the elapsed time value $\Delta t$ with a predetermined third timer threshold $t_c$ which is representative of the lowest vehicle level variation speed criteria. When the elapsed time value $\Delta t$ is greater than the third timer threshold $t_c$ as compared at the step 1220, the program goes END and thus the suspension is maintained at SOFT mode. On the other hand, when the elapsed time value $\Delta t$ is smaller than the first timer threshold $t_a$, then first HARD mode of the suspension is ordered and the control signal $S_c$ ordering the first HARD mode is output to the driver circuit at a step 1222. When the elapsed time value $\Delta t$ is greater than the first timer threshold $t_a$ but smaller than the second timer threshold $t_b$, *then the second HARD mode of the suspension is ordered and the control signal $S_c$* ordering the second HARD mode is output to the driver circuit at a step 1224. When the elapsed time value $\Delta t$ is equal to or greater than the second timer threshold $t_b$ but smaller than the third timer threshold $t_c$, then third HARD mode of the suspension is output to the driver circuit at a step 1226. After one of the steps 1222, 1224 and 1226, another timer 110 is set to a predetermined value which defines a period of time for maintaining the suspension in HARD mode, at a step 1228.

Then, the timer value T of the timer 110 is checked whether it is zero, at a step 1230. If the timer value T is greater than zero, the timer value T is decremented by a predetermined value, e.g. 1, at a step 1232. A loop of the steps 1230 and 1232 is repeated until the timer value T becomes zero. When the timer value T as checked at the step 1230 become zero, the SOFT moce of the suspension is ordered and the control signal $S_c$ is output at a step 1234.

As will be appreciated herefrom, according to the shown modification of the anti-dive control program, damping characteristics of the suspension system can be controlled in more precise manner than in the foregoing first embodiment.

It should be noted that though the suspension control system according to the present invention has been described hereabove to control variable damping characteristics shock absorber, damping characteristics of the suspension system can be controlled in various ways. Examples of other suspension control systems which can perform anti-dive suspension control will be described herebelow.

Figure 14:
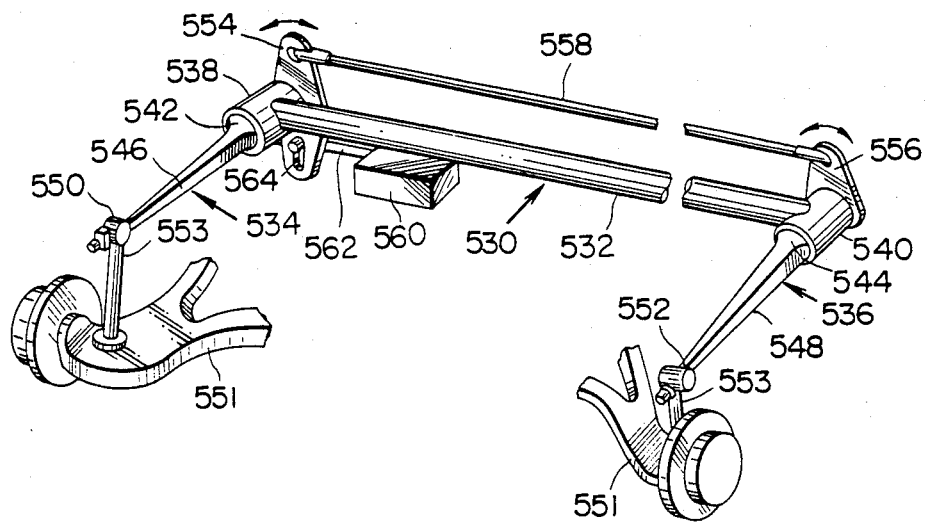
FIG. 14 is a perspective illustration of a stabilizer which constitutes the second embodiment of the suspension control system according to the invention.
Figure 15:
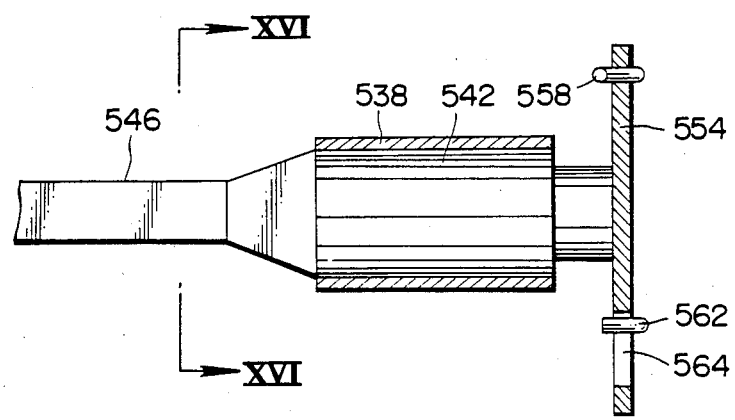
FIG. 15 is an enlarged section through a major part of the stabilizer of FIG. 14.
Figure 16:
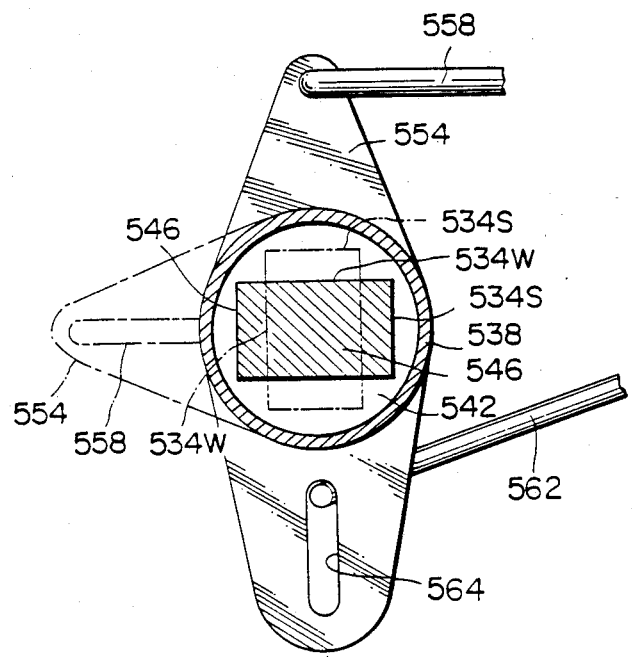
FIG. 16 is a cross-section taken along line XVI—XVI of FIG. 15.

FIGS. 14 to 16 show the structure of a roll stabilizer 530 controlled by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearings 538 and 540 at both ends. The parallel bar sections 534 and 536 have end segments 542 and 544 of circular cross-section bar section 532 and a pair of parallel bar sections 534 and 536. The transverse bar section 532 extends essentially perpendicular to the vehicle axis and has a circular cross-section. The transverse bar section 532 is connected to hollow cylindrical bearings 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearings 538 and 540. Link plates 554 and 556 are rigidly fitted onto the protruding ends of the parallel bar sections 534 and 536. The link plates 554 and 556 are rotatable about the bearings 538 and 540 together with the parallel bar sections 534 and 536. The link plates are connected to each other through a linkage 558. In addition, the link plate 554 is associated with an actuator 560 through an actuation rod 562 engaging an elongated opening 564 of the link plate 554. The actuator 560 may comprise an electromagnetically operative solenoid. The actuator is energized by a control signal from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 536 through 90° within the bearing 540.

As shown in FIG. 14, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the nose-dive magnitude matches or exceeds the threshold value, triggering anti-dive control, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve anti-dive suspension control comparable to that of the first embodiment.

Figure 17:
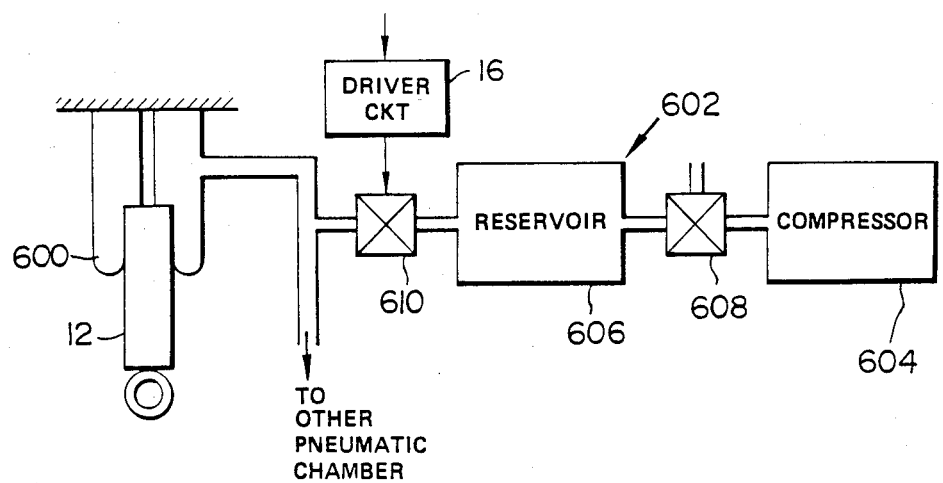
FIG. 17 is a schematic diagram of a vehicle height regulator system which controls vehicular height by controlling pneumatic pressure in a pneumatic chamber, which pneumatic pressure in the pneumatic chamber will serve as pneumatic spring for controlling damping characteristics of the suspension and thus constitutes the third embodiment of the suspension control system of the invention.

FIG. 17 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of thepneumatic chamber and a smaller volume is achieved by blocking fluid communication between the pneumatic chamber and the fluid reservoir, the pneumatic chamber becomes relatively rigid in this case, providing a larger damping force in response to nose-dive, which is detected in the manner set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The suspension system structure of FIG. 17 has been disclosed in U.S. Pat. Nos. 4,349,077 to Sekiguchi et al and 4,327,936 to Sekiguchi. In addition, a similar system has been disclosed in the co-pending U.S. patent application Ser. No. 573,504, filed on Jan. 24, 1984, which corresponds to the co-pending European Patent Application No. 84100729.7, filed on Jan. 24, 1984. The contents of the above-identified U.S. Patents and the co-pending applications are hereby incorporated by reference.

Anti-dive suspension control can also be achieved with this suspension system in substantially the same way as described in the first embodiment of the invention. For instance, when the magnitude and rate of change of the vehicle height exceeds their criteria, the pressure control valve 610 is closed to block fluid communication between the pneumatic chamber 600 and the reservoir in order to increase the stiffness of the strut assembly and so produce a greater damping force with which to suppress nose-dive of the vehicle body. On the other hand, under normal driving conditions, the pressure control valve 610 remains open, allowing fluid communication between the pneumatic chamber and the reservoir chamber. As a result, sufficiently soft shock-absorbing characteristics can be provided to ensure good riding comfort.

As set forth above, according to the present invention, the vehicular suspension system can provide both riding comfort and good drivability by controlling hardness of the suspension depending upon the magnitude of nose-dive in response to application of vehicular brake.

While the specific embodiments have been disclosed in order to facilitate better understanding of the invention, it should be noted that the invention can be embodied in various ways other than that illustrated hereinabove. Therefore, the invention should be understood to include all of the possible embodiments and modifications of the embodiments which can be embodied without departing from the principles of the invention, which are set out in the appended claims.

What is claimed is:

1. A suspension control system for an automotive vehicle comprising:
   a vehicular suspension system with damping characteristics variable at least between a first harder suspension mode and a second softer suspension mode;
   a first sensor which detects vehicular braking and produces a first sensor signal indicative thereof;
   a second sensor for monitoring vehicle height relative to a road surface and producing a second sensor signal indicative of the vehicle height;
   a controller responsive to said first sensor signal indicating vehicle braking to derive a signal indicating magnitude of vehicle height displacement after vehicle braking and a signal indicating rate of change of vehicle height after vehicle braking from said second sensor signal, comparing the signal indicating magnitude of height displacement with a first reference value representative of a vehicle height displacement harder suspension criterion and comparing the signal indicating rate of change of vehicle height with a second reference value representative of a vehicle rate of change of height harder suspension mode criterion, and producing a control signal for operating said vehicular suspension system in said first harder suspension mode when said signal indicating magnitude of height displacement is greater than said first reference value and said signal indicating rate of change of vehicle height is higher than said second reference value.

2. The suspension control system as set forth in claim 1, wherein said controller outputs a control signal ordering said suspension to operate in said first mode for a given period of time.

3. The suspension control system as set forth in claim 2, wherein said second sensor is an ultra-sonic sensor transmitting ultra-sonic waves toward the road surface and measuring the period of time between said transmission and reception of ultra-sonic waves reflected by the road surface.

4. The suspension control system as set forth in claim 2, wherein said vehicular suspension can be operated into any of a plurality of hardness levels when the signal indicating magnitude of change of vehicle height is in excess of said first reference value and the signal indicating rate of change of vehicle height is in excess of said second reference value, and said controller selects one of said hardness levels depending upon the value of the signal indicating rate of change of vehicle height.

5. The suspension control system as set forth in claim 3, wherein said suspension system comprises a hydraulic shock absorber with damping characteristics variable at least between said first mode and said second mode.

6. The suspension control system as set forth in claim 5, wherein said hydraulic shock absorber has upper and lower fluid chambers filled with a working fluid and of variable volumes according to a piston stroke, said shock absorber being provided with a flow control valve which is operable in either one of a first mode position, in which it restricts the rate of flow of working fluid between said upper and lower fluid chambers to a minimum rate, and a second mode position in which it allows fluid flow between said chambers at a maximum rate.

7. The suspension control system as set forth in claim 3, wherein said suspension system comprises a stabilizer with stiffness variable at least between said first mode and said second mode.

8. The suspension control system as set forth in claim 3, wherein said suspension system comprises a pneumatic spring means providing pneumatic damping force variable at least between said first mode and said second mode.

9. A suspension control system for an automotive vehicle comprising:
   a suspension system with damping characteristics variable at least between a first harder suspension mode and a second softer suspension mode;
   a first sensor for detecting application of vehicular brakes and producing a first sensor signal indicative thereof;
   a second sensor for monitoring vehicle height relative to a road surface and producing a second sensor signal indicative of the vehicle height;
   a timer responsive to said first sensor signal to measure elapsed time and produce a timer signal indicative thereof;
   a controller responsive to said first sensor signal to derive a first reference value on the basis of an instantaneous value of said second sensor signal at the time of occurrence of said first sensor signal, comparing subsequently received second sensor signal values with said first reference value so as to detect when said second sensor signal value drops below said first reference value to indicate a predetermined displacement in vehicle height, latching said timer signal value in response to said second sensor signal value dropping below said first reference value, comparing said latched timer signal value with a predetermined second reference value, and producing a control signal for operating said vehicular suspension system in said first harder suspension mode when said timer signal value is less than said second reference value thus indicating that said predetermined displacement in vehicle height occurred within a predetermined time period.

10. The suspension control system as set forth in claim 9, wherein said controller derives said first reference value from said instantaneous value of said second sensor signal in response to each occurrence of said first sensor signal.

11. The suspension control system as set forth in claim 10, wherein said controller derives said first reference value by subtracting a given constant value from said instantaneous value.

12. The suspension control system as set forth in claim 11, wherein said suspension system selectes one of a plurality of hardness levels when said first harder mode is ordered, and said controller selects one of said hardness levels depending upon said latched timer value.

13. The suspension control system as set forth in claim 12, wherein said controller compares said latched timer signal with a plurality of differing second reference values to select the hardness level for said suspension system.

14. The suspension control system as set forth in claim 13, wherein said suspension system can operate in any one of a highest hardness level, a lowest hardness level and an intermediate hardness level between said highest and lowest levels, and said controller compares said timer signal value with a greatest second reference value, a least second reference value and an intermediate second reference value which is between said greatest and smallest second reference values, said controller selecting one of said hardness levels in this following manner:

when said timer signal value is less than said least second reference signal value, said highest hardness level is selected;

when said timer value is greater than said lease second reference value but less than said intermediate second reference value, said intermediate hardness level is selected;

when said timer value is greater than said intermediate second reference value but less than said greatest second reference value, said softest hardness mode is selected; and when said timer value is greater than said greatest second reference value, said controller maintains said second softer mode.

15. The suspension control system as set forth in claim 11, wherein said controller holds said suspension system in said first mode for a given period of time.

16. The suspension control system as set forth in claim 15, wherein said controller holds said suspension system in said second mode while said vehicle speed signal value is held greater than said threshold value.

17. The suspension control system as set forth in claim 11, wherein said suspension system comprises a hydraulic shock absorber with damping characteristics variable at least between said first mode and said second mode.

18. The suspension control system as set forth in claim 17, wherein said hydraulic shock absorber has upper and lower fluid chambers filled with a working fluid and with variable volumes according to a piston stroke, said shock absorber being provided with a flow control valve operable in either of a first mode position in which it restricts the rate of flow of working fluid between said upper and lower fluid chambers to a minimum rate, and a second mode position in which its allows fluid flow between said chambers at a maximum rate.

19. The suspension control system as set forth in claim 11, wherein said suspension system comprises a stabilizer of stiffness variable at least between said first mode and said second mode.

20. The suspension control system as set forth in claim 11, wherein said suspension system comprises a pneumatic spring means providing pneumatic damping force variable at least between said first mode and said second mode.

21. In an automotive suspension system with damping characteristics variable at least between a first harder suspension mode and a second softer suspension mode, a method for anti-dive controlling the suspension comprising the steps of:

detecting vehicular braking;

monitoring vehicular height relative to a read surface;

detecting, in response to vehicular bracking, when the change in the vehicle height exceeds a given first threshold to indicate a predetermined displacement in vehicle height;

detecting, in response to vehicular braking and a change in the vehicle height in excess of said first threshold, when the rate of change of the vehicle height through said predetermined displacement exceeds a given second threshold; and operating said suspension system in said first harder suspension mode when said change in said vehicle height exceeds said first given threshold and said rate of change of said vehicle height exceeding said second given threshold are detected.

22. The method as set forth in claim 21, wherein said first given value varies with the instantaneous vehicle height upon application of the vehicular brakes.

23. The method as set forth in claim 22, which further comprises a step of switching said suspension system from said first mode to said second mode after a given period.

24. The method as set forth in claim 23, which further comprises a step of deriving said first given value by subtracting a given constant value from said instantaneous vehicle height.

25. The method as set forth in claim 23, wherein said suspension system selects one of a plurality of hardness levels when said first hard mode is ordered, and which further comprises a step of selecting the hardness level depending upon said said rate of change of said vehicle height.

26. The method as set forth in claim 25, wherein the rate of change of vehicle height is compared with each of a plurality of differing reference values to select one of said hardness levels for said suspension system.

27. The method as set forth in claim 26, wherein said suspension system can operate in a highest level, a lowest level and an intermediate level between said highest and lowest level, and the rate of change of vehicle height is compared with a greatest reference value, a least reference value and an intermediate reference value between said greatest and least reference values, said controller selecting the hardness level in the following manner:

when the rate of change is less than said least reference signal value, said highest hardness level is selected;

when the rate of change is greater than said least reference value but less than said intermediate second reference value, said intermediate hardness level is selected;

when the rate of change is greater than said intermediate reference value but less than said greatest reference value, said softest hardness mode is selected; and when the rate of change is greater than said greatest reference value, said controller selects said second softer mode.

28. A suspension control system for an automotive vehicle comprising:

a vehicular suspension system with damping characteristics variable at least between a first harder suspension mode and a second softer suspension mode;

a first sensor which detects vehicular braking and produces a first sensor signal indicative thereof;

a second sensor for monitoring vertical height of a body of said vehicle and producing a second sensor signal indicative thereof; and a controller responsive to said first sensor signal to derive the magnitude of change and rate of change of said second sensor signal, comparing the derived magnitude of change of said second sensor signal with a first reference value and comparing the derived rate of change of said second sensor signal with a second reference value, and operating said vehicular suspension system in said first harder suspension mode when said magnitude of change of said second sensor signal is greater than said first reference value and said rate of change of said second sensor signal is higher than said second reference value, and in said second softer suspension mode otherwise.

29. A suspension control system for an automotive vehicle comprising:
a suspension system with damping characteristics variable at least between a first harder suspension mode and a second softer suspension mode;
a first sensor for detecting application of vehicular brakes and producing a first sensor signal indicative thereof;
a second sensor for monitoring vertical height of a body of said vehicle and producing a second sensor signal indicative thereof;
a timer responsive to said first sensor signal to measure elapsed time from the application of said vehicle brakes and produce a timer signal indicative thereof; and
a contrller responsive to said first sensor signal to derive a first reference value on the basis of the instantaneous vlaue of said second sensor signal at the time of occurrence of said first sensor signal, comparing subsequently received second sensor signal values with said first reference value so as to detect when said second sensor signal value drops below said first reference value, latching said timer signal value in response to said second sensor signal value dropping below said first reference value, comparing said latched timer signal value with a predetermined second reference value, and operating said vehicular suspension system in said first harder suspension mode when said timer signal value is less than said second reference value, and in said second softer suspension mode otherwise.

30. In a automotive suspension system with damping characteristics variable at least between a first harder suspension mode and a second softer suspension mode, a method for anti-dive controlling the suspension comprising the steps of:
detecting vehicular braking;
monitoring vertical height of a body of said vehicle;
detecting, in response to vehicular braking, when the change in the vehicle height exceeds a given first threshold to indicate a predetermined vertical displacement of said vehicle body;
detecting, in response to vehicular braking and a change in the vehicle height in excess of said first threshold, whether the rate of change of the vehicle height through said vertical displacement exceeds a given second threshold; and
operating said suspension system in said first harder suspension mode when said change in said vehicle height exceeds said first given threshold and said rate of change of said vehicle height exceeding said second given threshold are detected.

31. A suspension control system for an automotive vehicle comprising:
a vehicular suspension system with damping characteristics variable at least between a first harder suspension mode an a second softer suspension mode;
a first sensor which detects vehicular braking and produces a first sensor signal indicative thereof;
a second sensor for monitoring vehicle height relative to a road surface and producing a second sensor signal indicative of the vehicle height; and
a controller responsive to said first sensor signal to derive magnitude and rate of change of said second sensor signal, comparing the derived magnitude of change of said second sensor signal with a first reference value which is representative of a vehicle height change dependent harder suspension criterion, and comparing the derived rate of change of said second sensor signal with a second reference value which is representative of a rate of height change dependent harder suspension mode criterion, wherein said controller normally produces a control signal for operating said suspension system in said second softer suspension mode and produces a control signal for operating said vehicular suspension system in said first harder suspension mode when both conditions that said magnitude of change of said second sensor signal is greater than said first reference value and said rate of change of said second sensor signal value is higher than said second reference value are satisfied.

32. A suspension control system for an automotive vehicle comprising:
a vehicular suspension system with damping characteristics variable at least between a first harder suspension mode and a second softer suspension mode;
a first detector which produces a first detector signal indicative of the beginning of a vehicle deceleration period;
a second detector means responsive to said first detector signal for detecting magnitude of vertical displacement of the vehicle body relative to the road surface to produce a second detector signal when the detected magnitude of vertical displacement is greater than a first reference value which represents a displacement magnitude dependent harder suspension criterion;
a third detector means for detecting speed of vertical displacement of the vehicle body relative to the road surface to produce a third detector signal when the detected speed of vertical displacement is higher than a second reference value which represents a displacement speed dependent harder suspension criterion; and
a controller which normally produces a control signal for operating said suspension system in said second softer suspension mode and produces a control signal for operating said vehicular suspension system in said first harder suspension mode when said second and third detector signals are produced.

* * * * *